Sept. 30, 1969  M. PUTZIG  3,469,960
APPARATUS FOR PRODUCING MINERAL WOOL
Filed Oct. 14, 1966
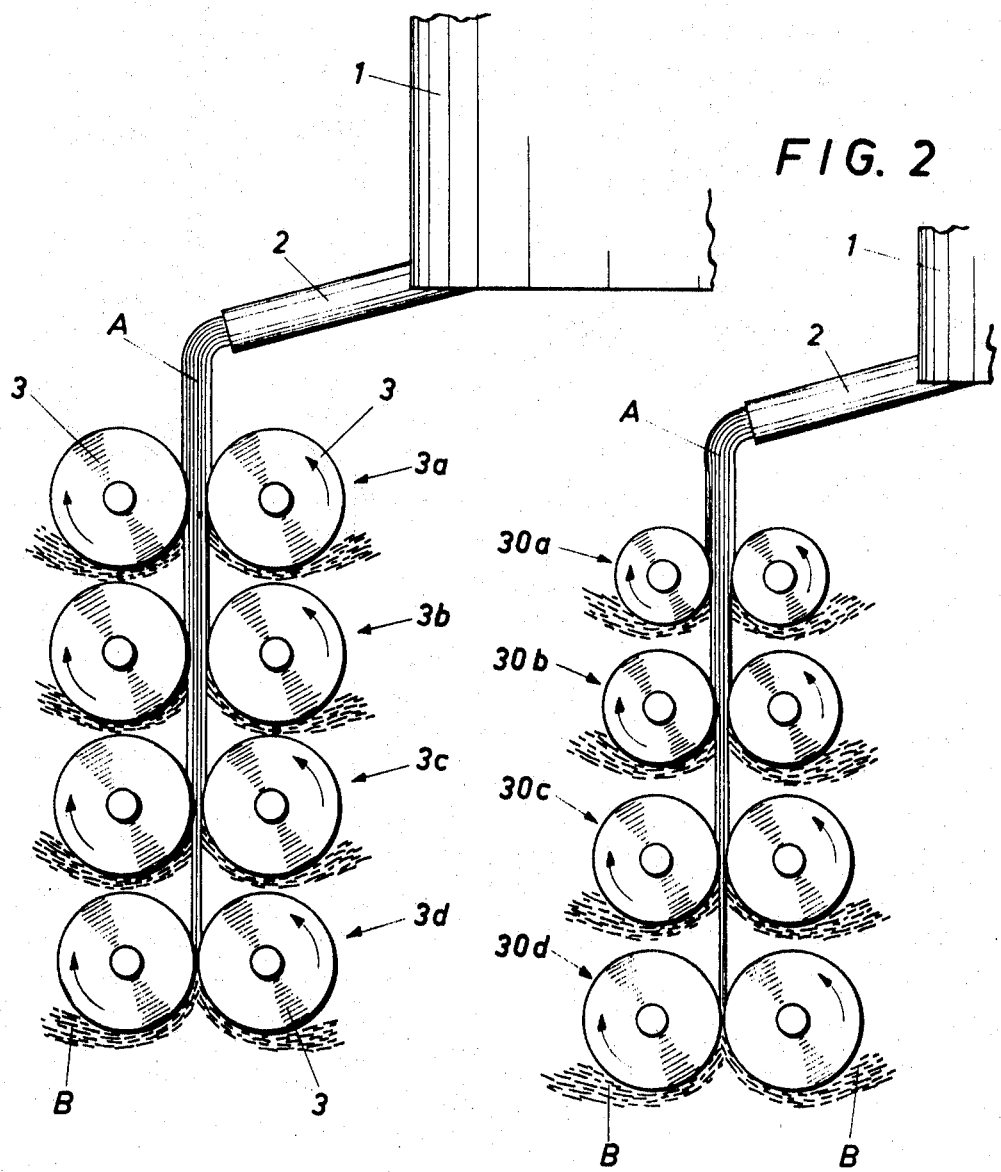

United States Patent Office 3,469,960
Patented Sept. 30, 1969

3,469,960
APPARATUS FOR PRODUCING MINERAL WOOL
Max Putzig, Hasselgatan 4, Goteborg V, Sweden
Filed Oct. 14, 1966, Ser. No. 586,692
Int. Cl. C03b *19/04, 37/04*
U.S. Cl. 65—15                                6 Claims

ABSTRACT OF THE DISCLOSURE

An apparatus for producing mineral wool including parts of rapidly rotating drums arranged one below the other with one drum of each part being located on opposite sides of a free falling stream of melted substance. Each drum withdraws a thin layer of substance from the free falling stream and the free space between the drums of each pair is continuously decreased downwardly in order to compensate for the reduced thickness of the stream.

BACKGROUND OF THE INVENTION

The present invention relates to producing mineral wool from a melted substance which is poured in a stream onto the envelope surfaces of rapidly rotating drums arranged in pairs.

One object of the invention is to provide an apparatus in which the produced fibers are supplied continuously and evenly to a collection means notwithstanding variations in the temperature of the melt.

A further object of the invention is to provide an apparatus having a large output capacity and in which the relationship between the volume and weight of the wool is correct.

SUMMARY OF THE INVENTION

The apparatus utilized for producing mineral wool according to the invention consists of drums arranged in pairs with one below the other and arranged to rotate rapidly in opposite directions, the drums of each pair being located on the same level, to each side of the stream and at the same distance from the center line thereof, with such distance decreasing downwardly from pair to pair.

The invention will below be described with reference to the attached drawings, on which:

BRIEF DESCRIPTION OF THE DRAWINGS

FIGURE 1 is an elevational view schematically illustrating the essential parts of an apparatus according to the invention and FIGURE 2 is a view similar to FIGURE 1 of a modified embodiment of the invention.

DETAILED DESCRIPTION OF THE INVENTION

A furnace for melting the mineral substance is denoted 1. Due to the design of the apparatus, the furnace may be of a simple and inexpensive type compared to the furnaces commonly used with other apparatuses for producing mineral wool, and even if variations in the temperature do occur the wool produced will be of good quality. The furnace 1 is provided with a spout 2 from which a stream A of the melted substance is poured to run freely downwardly between a plurality of drums 3. The drums are arranged in pairs, and the pairs of drums 3a–3d are arranged one directly below the other. The stream A runs between the drums in the pairs and the drums of each pair are located at the same distance from the vertical center line of the stream A. This distance decreases downwardly from pair to pair. The drums are arranged sufficiently close together to bring the outer surfaces into contact with the stream. Each drum withdraws a thin layer from the stream and the thickness thereof is reduced during the downward movement. The distance between the drums of a following pair is consequently decreased and the drums of the lowermost pair are so located that each drum withdraws one half of the remaining stream.

The drums 3 have the same diameter and are designed to rotate at comparatively high speed and the substance collected by each drum is thrown outwardly in the form of droplets, which, during the continued movement away from the drum essentially tangentially thereto, are stretched to thin fibers B. These are torn away from the drums, partly due to the action of centrifugal force and partly due to a stream of air, preferably supplied in the axial direction of the drums. This stream of air is adapted, in a manner known per se, to carry the fibers to a collecting and transporting means through which the air is withdrawn. As the stream of melted substance flows centrally between the pairs of drums arranged vertically below each other, the capacity of the drums located on opposite sides of the stream will remain constant notwithstanding variations in temperatures of the melt. The volume transferred from opposite sides of the apparatus to the collecting means will thus be essentially equal. This is highly important, especially when the wool is utilized to produce insulation blankets in which the layer of fibers must be uniform throughout.

The apparatus according to FIGURE 2 consists of basically the same pairs as in FIGURE 1. The melted substance runs from the furnace 1 through the spout 2 in a stream A between two banks of drums. In this case, however, the diameter of the drums increases from the topmost pair 30a stepwise in the direction of the lowermost pair of drums 30d. If the drums, as in FIGURE 1 are driven at the same speed, the increased peripheral velocity will compensate for the decreasing temperature of the melt. The same result as in FIGURE 1 will be obtained if the lower pairs of drums are driven at higher speed.

In order to facilitate a collection of the fibers below the bank of drums, the drums may be arranged in such a manner that the diameter decreases from the topmost to the lowermost pair. From a mechanical point of view it is also easier to rotate a small diameter drum at high speed.

I claim:
1. In an apparatus for producing mineral wool, including a furnace for melting a mineral substance, and a spout for pouring the melted substance in a free falling stream, a plurality of drums arranged in pairs about horizontal axes, two or more pairs being arranged one below the other, with the axes of the drums of the respective pair being so located in relation to the vertical center line of the stream that the outer surfaces of each pair of drums are sufficiently close to bring said surfaces into contact with the stream and withdraw a thin, uniform layer therefrom, a number of the pairs of drums in relation to the thickness of the stream leaving the spout being such that each of the drums of the lowermost pair withdraw one half of the remaining part of the stream, and means to rotate the drums of each pair rapidly in opposite directions.

2. The apparatus as claimed in claim 1 in which all drums are of equal diameter.

3. The apparatus as claimed in claim 1 in which the diameter of the drums increases from the topmost to the lowermost pair.

4. The apparatus as claimed in claim 1 in which the diameter of the drums decreases from the topmost to the lowermost pair.

5. The apparatus as claimed in claim 1 in which the means to rotate the drums is designed so that the peripheral velocity of all drums is the same.

6. The apparatus as claimed in claim 1 in which the means to rotate the drums is designed so that all drums rotate at the same speed.

References Cited

UNITED STATES PATENTS

| | | | |
|---|---|---|---|
| 2,398,707 | 4/1946 | Hawthorne et al. | 65—15 |
| 2,520,168 | 8/1950 | Powell | 65—8 |
| 2,700,176 | 1/1955 | Graybeal | 65—15 |
| 2,807,048 | 9/1957 | Hedges | 65—15 |
| 3,303,009 | 2/1967 | Sagen et al. | |

S. LEON BASHORE, Primary Examiner

R. L. LINDSAY, JR., Assistant Examiner

U.S. Cl. X.R.

18—2.6, 8; 65—8